3,538,098
PROCESS FOR THE PRODUCTION OF
COUMARIN DERIVATIVES
Rudi Beyerle, Bruckhobel, Kreis Hanau, Adolf Stachel, Rolf-Eberhard Nitz, Klaus Resag, and Eckhard Schraven, Frankfurt am Main-Fechenheim, and Heinrich Ritter, Bornigheim, Kreis Hanau, Germany, assignors to Cassella Farbwerke Mainkur Aktiengesellschaft, Frankfurt am Main-Fechenheim, Germany, a company of Germany
No Drawing. Filed Oct. 24, 1967, Ser. No. 677,724
Claims priority, application Germany, Nov. 12, 1966, C 40,572; Sept. 21, 1967, C 43,388; Sept. 26, 1967, C 43,426
Int. Cl. C07d 51/70
U.S. Cl. 260—268        9 Claims

ABSTRACT OF THE DISCLOSURE

This disclosure describes new and useful pharmaceutical products particularly useful as coronary dilators. They can be designated as coumarin derivatives having the formula

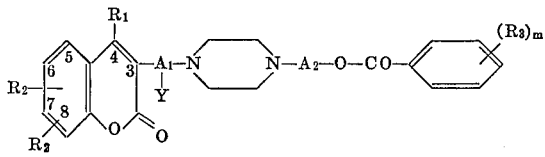

the radicals in each instance having the following significance: $R_1$ represents hydrogen, lower alkyl or phenyl, $R_2$ represents 6,7- or 7,8-positioned alkoxy, $R_3$ represents lower alkoxy having 1–4 carbon atoms, $m$ represents the integer 1, 2 or 3, $A_1$ represents a straight or branched alkylene radical having 2–3 carbon atoms, $A_2$ represents straight or branched alkylene radicals having 2–4 carbon atoms hal represents a halogen atom, Y represents hydrogen, a hydroxyl group or the residue

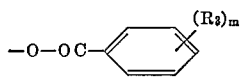

and X represents hydrogen or a hydroxy group.

---

The present invention relates to new, pharmacologically valuable coumarin derivatives and processes for their manufacture.

These new coumarin derivatives have the general formula

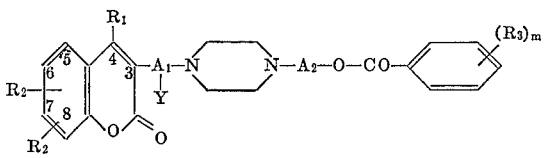

wherein $R_1$ means hydrogen, lower alkyl, or phenyl, $R_2$ stands for 6,7- or 7,8-positioned alkoxy, $R_3$ represents lower alkoxy having 1–4 carbon atoms, $m$ is the integer 1, 2 or 3, $A_1$ is a straight or branched alkylene radical having 2–3 carbon atoms, $A_2$ is a straight or branched alkylene radical having 2–4 carbon atoms and Y stands for hydrogen, a hydroxy group or for the residue

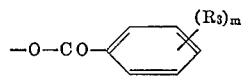

The new coumarin derivatives are obtained in the known methods:

(a) By acylating, possibly in the presence of an acid-binding agent, coumarin derivatives of the general formula

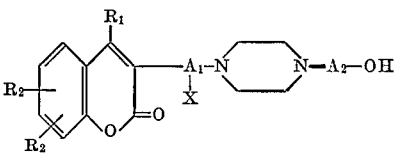

wherein X stands for hydrogen or a hydroxy group, with an alkoxy benzoic acid of the general formula

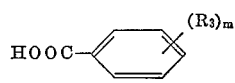

or with a functional derivative, or (b) By condensing, possibly in the presence of an acid-binding agent, coumarin derivatives of the general formula

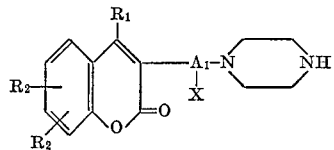

with an alkoxy benzoic acid haloalkyl ester of the general formula

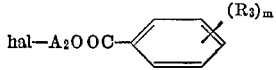

wherein hal stands for a halogen atom.

As low molecular alkyl radicals $R_1$ and alkoxy radicals $R_2$ in 6,7- or 7,8-position or $R_3$ are used particularly those having 1–4 carbon atoms.

If starting products are used in which the bridge member $A_1$ does not contain any hydroxy group, the claimed process yields the corresponding monoesters and if a hydroxy group is present, it yields mono and diesters. According to the present invention, monoesters are obtained if coumarin starting materials are acylated with 1 mol alkoxy benzoic acid or the functional derivative; the corresponding diesters are obtained if 2 moles of the latter are used. If diesters are prepared, the esterification may also be done in two steps, whereby in either step various alkoxy benzoic acids or their functional derivatives may be used as acylating agents. This technique permits the preparation of mixed diesters that contain two different acyl radicals. When operating according to the condensation process (b) of the present invention, only monoesters are obtainable, which, however, may also be converted into diesters according to the esterification process (a) by means of a second mol of the acylating agent, provided the intermediate member $A_1$ contains a hydroxy group capable of acylation.

The coumarine derivatives obtainable under the present invention are valuable pharmaceutics. In particular, they are excellent coronary dilators and, in this respect, superior to other known substances having such properties. Their salts are colorless, crystalline substances that easily dissolve in water.

With respect to the change in the oxygen tension in the coronary veinous blood, the phamacological investigation of the vasodilator action on the coronary vessels was carried out in dogs according to the methods described by W. K. A. Schaper and his coworkers (see W. K. A. Schaper, R. Xhonneux, and J. M. Bogaard, "Uber die kontinuierliche Messung des Sauerstoffdruckes im venösen Coronarblut," Naunyn-Schmiedeberg's Arch. exp. Path. u. Pharmak. 245, 383–389 (1963)). The test preparations were applied intravenously to the narcotized and spontaneously breathing animals. On these test conditions the dilatation of the coronary arteries caused by the test substances along with the increase in the coronary blood flow led to an increase in the oxygen tension in the coronary veinous blood. This oxygen tension was measured according to polarographic methods by means of a platin electrode of the Gleichmann Lübbers type (see U. Gleichmann and D. W. Lübbers, "Die Messung des Sauerstoffdruckes in Gasen und Flüssigkeiten mit der Platin-Elektrode unter besonderer Berücksichtigung der Messung im Blut," Pflügers Arch. 271, 431–455 (1960)). The heart rate was continuously measured by electronic methods from systolic peaks of the arterial blood pressure.

The arterial blood pressure was measured in the known manner in the femoral artery with the aid of an electromanometer of the Stratham-strain-gauge type.

The following table gives the results of the pharmacological investigations which were carried through. The preparations were tested in the form of their respective dihydrochlorides:

| Preparation | $LD_{50}$ g./kg. mouse i.v. | Dosage, mg./kg. i.v. | Maximal increase in oxygen tension in the coronary veinous blood | | Maximal change in the heart rate | | Maximal change in the blood pressure | |
|---|---|---|---|---|---|---|---|---|
| | | | In percent | In minutes | In percent | In minutes | In percent | In minutes |
| 3-[β-(4'-(β-3",4",5"-trimethoxybenzoxyethyl)-piperazino[1'])-ethyl]-4-methyl-7,8-dimethoxy-coumarin | 0.04 | 1.0 | +112 | 40 | +28 | 30 | −10 | 40 |
| 3-[β-(4'-(β-3",4",5"-trimethoxybenzoxyethyl)-piperazino[1'])-ethyl]-4-phenyl-7,8-dimethoxy-coumarin | 0.042 | 1.0 | +128 | >20 | −5 | >20 | −24 | 2 |
| 3-[β-4'-(δ-3",4",5"-trimethoxybenzoxybutyl)-piperazino[1'])-ethyl]-4-propyl-7,8-dimethoxy-coumarin | 0.016 | 1.0 | +62 | 20 | +11 | 10 | −14 | 20 |
| 3-[β-(4-(β-3",4",5"-trimethoxybenzoxypropyl)-piperazino[1'])-ethyl]-4-propyl-7,8-dimethoxy-coumarin | 0.026 | 2.0 | +171 | 35 | +7 | 2 | −19 | >35 |
| 3-[β(4'-(δ-3",4",5"-trimethoxybenzoxybutyl)-piperazino[1'])-ethyl]-4-methyl-7,8-dimethoxy-coumarin | 0.023 | 2.0 | +104 | >20 | −8 | 20 | −20 | >20 |
| 3-[β-4'-(β-3",4",5"-trimethoxybenzoxyethyl)-piperazino[1'])-ethyl]-4-propyl-7,8-dimethoxy-coumarin | 0.042 | 1.0 | +65 | >40 | +10 | >40 | −5 | >40 |
| 3-[γ-(4'-(β-3",4",5"-trimethoxybenzoxyethyl)-piperazino[1'])-β-hydroxypropyl]-4-methyl-7,8-dimethoxy-coumarin | | 0.5 | +32 | 10 | +28 | >20 | −8 | >20 |
| 3-[γ-(4'-(β-3",4",5"-trimethoxybenzoxyethyl)-piperazino[1'])-β-3",4",5"-trimethoxybenzoxypropyl]-4-methyl-7,8-dimethoxy-coumarin | 0.3 | 2.0 | +141 | >74 | −13 | 55 | −40 | 65 |
| 3-[γ-(4'-(β-3",4",5"-trimethoxybenzoxyethyl)-piperazino[1'])-β-3",4",5"-trimethoxybenzoxypropyl]-4-phenyl-7,8-dimethoxy-coumarin | 0.042 | 2.0 | +33 | >80 | +4 | 5 | −11 | 30 |
| 3-[γ-(4'-(δ-3",4",5"-trimethoxybenzoxybutyl)-piperazino[1'])-β-3",4",5"-trimethoxybenzoxypropyl]-4-phenyl-7,8-dimethoxy-coumarin | 0.03 | 2.0 | +67 | 30 | −21 | 20 | +4 | 10 |
| 3-[γ-(4'-(β-3",4",5",-trimethoxybenzoxyethyl)-piperazino[1'])-β-3",4",5"-trimethoxybenzoxypropyl]-4-methyl-7,8-diethoxy-coumarin | 0.1 | 2.0 | +100 | 30 | −18 | >30 | −20 | >30 |
| 3-[γ-(4'-(δ-3",4",5"-trimethoxybenzoxybutyl)-piperazino[1'])-β-3",4",5"-trimethoxybenzoxypropyl]-4-methyl-7,8-dimethoxy-coumarin | 0.068 | 2.0 | +54 | 40 | −32 | 10 | −42 | 30 |
| 3-[γ-(4'-(β-3"',4"',5"'-trimethoxybenzoxyethyl)-piperazino[1'])-δ-3",4",5"-trimethoxybenzoxypropyl]-4-propyl-7,8-dimethoxy-coumarin | 0.07 | 2.0 | +80 | 50 | −24 | 60 | −28 | >50 |
| 3-[γ-(4'-(β-3"',4"',5"'-trimethoxybenzoxybutyl)-piperazino[1'])-β-3",4",5"-trimethoxybenzoxypropyl]-4-propyl-7,8-dimethoxy-coumarin | 0.06 | 2.0 | +83 | 25 | −49 | >30 | −27 | 5 |
| 3-[γ-(4'-(β-3"',4"',5"'-trimethoxybenzoxypropyl)-piperazino[1'])-β-3",4",5"-trimethoxybenzoxypropyl]-4-propyl-7,8-dimethoxy-coumarin | 0.135 | 2.0 | +51 | >50 | −17 | >50 | −21 | 5 |
| 3-[β-(4'-(β-3"',4"',5"'-trimethoxybenzoxyethyl)-piperazino[1'])-ethyl]-4-methyl-6,7-dimethoxy-coumarin | 0.16 | 2.0 | +65 | 20 | +36 | 5 | −16 | 3 |
| 3-[β-(4'-(δ-3"',4"',5"'-trimethoxybenzoxypropyl)-piperazino[1'])-ethyl]-4-methyl-6,7-dimethoxy-coumarin | | 2.0 | +61 | 30 | +27 | 10 | −10 | 10 |
| 3-[β-(4'-(β-3"',4"',5"'-trimethoxybenzoxypropyl)-piperazino[1'])-ethyl]-4-propyl-6,7-dimethoxy-coumarin | 0.0675 | 2.0 | +55 | 50 | −14 | >20 | −18 | >50 |
| 3-[γ-(4'-(β-3"',4"',5"'-trimethoxybenzoxyethyl)-piperazino[1'])-β-3",4",5"-trimethoxybenzoxypropyl]-4-methyl-6,7-dimethoxy-coumarin | 0.5 | 2.0 | +67 | 50 | −26 | >50 | −33 | >50 |
| 3-[γ-(4'-(γ-3"',4"',5"'-trimethoxybenzoxypropyl)-piperazino[1'])-β-3",4",5"-trimethoxybenzoxypropyl]-4-phenyl-6,7-dimethoxy-coumarin | | 2.0 | +82 | 38 | −4 | >20 | −15 | >25 |
| 3-[γ-(4'-(β-3"',4"',5"'-trimethoxybenzoxypropyl)-piperazino[1'])-β-3",4",5"-trimethoxybenzoxypropyl]-4-methyl-6,7-dimethoxy-coumarin | 0.17 | 2.0 | +85 | 40 | −12 | >40 | −15 | 20 |
| 3-[γ-(4'-(β-3"',4"',5"'-trimethoxybenzoxypropyl)-piperazino[1'])-β-3",4",5"-trimethoxybenzoxypropyl]-4-propyl-6,7-dimethoxy-coumarin | | 2.0 | +52 | 55 | −19 | 50 | −32 | >50 |
| 3-[λ-(4'-(β-3"',4"',5"'-trimethoxybenzoxypropyl)-piperazino[1'])-β-3",4",5"-trimethoxybenzoxypropyl]-4-phenyl-6,7-dimethoxy-coumarin | | 2.0 | +79 | 25 | +7 | >35 | −27 | >22 |

In the preparation of dragées and tablets containing as essential active ingredient the coumarin derivatives of our invention these substances may be admixed with the conventional solid tabletting adjuvants, such as starch, lactose, talc and the like. Any of the tabletting materials and carriers customary in pharmaceutical practice may be employed.

For the preparation of the injection solutions the hydrochlorides of the coumarin derivatives are particularly suited since they have mostly a good water-solubility. Injection solutions of water-insoluble products may of course be prepared in the conventional manner by concurrently using well-known suspending agents, emulsifiers and/or solubilizers.

For a better understanding of the nature and the objects of this invention, reference should be made to the accompanying examples which are of an illustrative rather than a limiting nature. Unless otherwise stated, all temperatures given are in degrees centigrade.

EXAMPLE 1

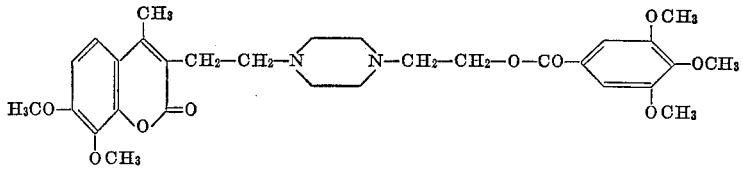

37.6 g. (0.1 mol) 3-[β-(4'-(β-hydroxyethyl)-piperazino[1'])-ethyl]-4-methyl-7,8-dimethoxy-coumarin are suspended in 200 cc. anhydrous benzene and 10.1 g. (0.1 mol) triethylamine are added. Within 30 minutes, a solution of 23 g. (0.1 mol) 3,4,5-trimethoxybenzoyl chloride in 100 cc. anhydrous benzene is added dropwise with stirring at room temperature. The mixture is stirred for 4–5 hours at this temperature. Subsequently, it is stirred under reflux for 2 hours and, while hot, separated triethylamine hydrochloride is filtered off with suction. The filtrate is washed with water, a 5% aqueous sodium hydrogen carbonate solution and again with water and dried over anhydrous sodium sulfate. The solvent is now distilled off at 50° in the water-jet vacuum and the residue, a light-yellow, viscous oil, is dissolved in little anhydrous ethyl acetate, then etheral hydrochloric acid is added until congo paper turns blue. Thus, the dihydrochloride of the 3-[β-(4'-(β-3'',4'',5''-trimethoxybenzoxyethyl)-piperazino[1'])-ethyl]-4-methyl-7,8-dimethoxy-coumarin is obtained in the form of colorless crystals decomposing at 239–240°.

Yield: 53 g.=82% of the theoretical.

The 3-[β-(4'-(β-hydroxyethyl)-piperazino[1'])-ethyl]-4-methyl-7,8-dimethoxy-coumarin used as starting material can be prepared as follows:

(a) 13 g. (0.055 mol) 3-(β-hydroxyethyl)-4-methyl-7,8-dihydroxy-coumarin (prepared according to the method described in Chem. Abstr. 54, 24690 g. (1960)), 40 cc. glacial acetic acid and 36 cc. 48% hydrobromic acid are stirred at 110–115° for 5 hours. After cooling down, the reaction mixture is poured into the fivefold quantity of water and the precipitate which has settled out is filtered off with suction. The reaction product being still wet can be recrystallized from glacial acetic acid. Thus, 14 g. (=85° of the theoretical) 3-(β-bromoethyl)-4-methyl-7,8-dihydroxy-coumarin are obtained having a melting point of 190°. Analogously, the following products were prepared:

3-(β-bromoethyl)-4-n-propyl-7,8-dihydroxy-coumarin.
Melting point: 175–177°.
3-(β-bromoethyl)-4-phenyl-7,8-dihydroxy-coumarin.
Melting point: 211–213°.

(b) 15 g. (0.05 mol) 3-(β-bromoethyl)-4-methyl-7,8-dihydroxy-coumarin are dissolved in 100 cc. dioxan and admixed with 25 g. dimethyl sulfate. When passing nitrogen thru this mixture, a solution of 7 g. sodium hydroxide in 20 cc. water is added dropwise with stirring, at 35–40°. Stirring of the reaction mixture is continued at 35–40° until it does not show an alkaline reaction any longer. After a further addititon of 25 g. dimethyl sulfate, again a solution of 7 g. sodium hydroxide in 20 cc. water is added dropwise. After the reaction mixture is no longer alkaline it is evaporated to dryness in the water-jet vacuum and the residue is diluted with water. The precipitated reaction product is dissolved in ethyl acetate and the ethyl acetate layer is washed with diluted sodium hydroxide solution, then dried and evaporated to dryness under reduced pressure. Thus, 3-(β-bromoethyl)-4-methyl-7,8-dimethoxy-coumarin is obtained in the form of colorless crystals melting at 147–149°.

Yield: 13 g.=79.3% of the theoretical.

Analogously to the process as described above, the following intermediates can be prepared:

3-(β-boromethyl)-4-n-propyl-7,8-dimethoxy-coumarin.
Melting point: 87–90°.
3-(β-bromoethyl)-4-phenyl-7,8-dimethoxy-coumarin.
Melting point: 163–165°.

(c) 32.7 g. (0.1 mol) 3-(β-bromoethyl)-4-methyl-7,8-dimethoxy-coumarin and 13 g. (0.1 mol) N-(β-hydroxyethyl)-piperazine are dissolved in 100 cc. chloro benzene. After the addition of 10.6 g. (0.1 mol) anhydrous sodium carbonate, the solution is stirred for 12 hours with boiling under reflux. After cooling down, precipitated sodium bromide is filtered off with suction and the filtrate is evaporated to dryness under reduced pressure. The remaining oily crude product is crystallized by stirring it with little ethyl acetate. The crystallized product is filtered off with suction and, for further purification, recrystallized from ethyl acetate. Thus, 3-[β-(4'-hydroxyl-ethyl-piperazino[1'])-ethyl]-4-methyl-7,8-dimethoxy-coumarin is obtained having a melting point of 210–212°.

Yield: 34 g.=90% of the theoretical.

Analogously, the intermediates of the following general formula can be synthetized:

General formula:

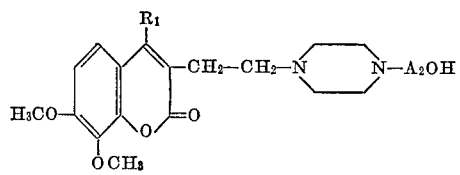

| $R_1$ | $-A_2-$ | Melting point, ° |
|---|---|---|
| $nC_3H_7$ | $-CH_2CH_2-$ | [1] 234–236 |
| $CH_3$ | $-CH_2-CH(CH_3)-$ | 147–148 |
| $CH_3$ | $-CH_2CH_2CH_2-$ | 120–121 |
| $nC_3H_7$ | $-CH_2-CH(CH_3)-$ | 133–135 |
| $nC_3H_7$ | $-CH_2CH_2CH_2-$ | 123–125 |
| $nC_3H_7$ | $-CH_2CH_2CH_2CH_2-$ | [1] 200–203 |
| $C_6H_5$ | $-CH_2CH_2-$ | [1] 233–235 |
| $C_6H_5$ | $-CH_2CH_2CH_2-$ | 85–87 |
| $C_6H_5$ | $-CH_2-CH(CH_3)-$ | 151–155 |
| $CH_3$ | $-CH_2CH_2CH_2CH_2-$ | 95–97 |

[1] As dihydrochloride.

Analogously to the description given in the present example, paragraph 1, the following compounds can be prepared under the present invention from the intermediates given above:

General formula:

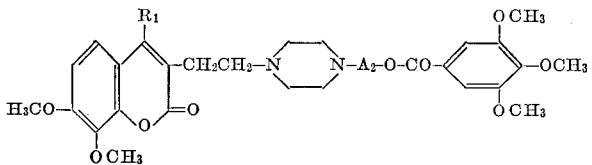

| R₁ | —A₂— | Melting Point or decomposition point of the dihydrochloride, ° |
|---|---|---|
| nC₃H₇ | —CH₂CH₂— | 227 |
| CH₃ | —CH₂—CH(CH₃)— | 147 |
| CH₃ | —CH₂CH₂CH₂— | 236 |
| nC₃H₇ | —CH₂—CH(CH₃)— | 225 |
| nC₃H₇ | —CH₂CH₂CH₂— | 238 |
| nC₃H₇ | —CH₂CH₂CH₂CH₂— | 224 |
| C₆H₅ | —CH₂CH₂— | 228–238 |
| C₆H₅ | —CH₂CH₂CH₂— | 104 |
| C₆H₅ | —CH₂—CH(CH₃)— | 150 |
| CH₃ | —CH₂CH₂CH₂CH₂— | 226–220 |

EXAMPLE 2

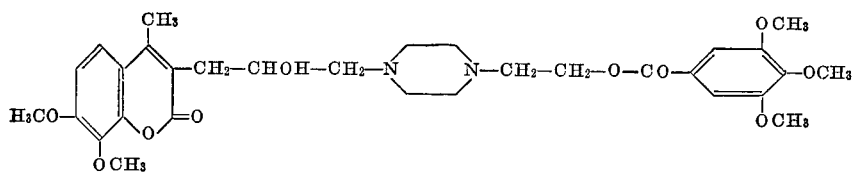

40.6 g. (0.1 mol) 3-[γ-(4'(β-hydroxyethyl)-piperazino[1'] - β - hydroxypropyl] - 4 - methyl - 7,8 - dimethoxy-coumarin are dissolved in 350 cc. anhydrous chloroform and admixed with 10.1 g. (0.1 mol) triethylamine. Within one hour, 23 g. (0.1 mol) 3,4,5-trimethoxy-benzoyl chloride, dissolved in 100 cc. anhydrous chloroform, are added dropwise with stirring. After the exothermic reaction has decayed, the solution is stirred at 40–50° for another 2 hours, cooled down and admixed with water. The chloroform phase is separated and washed with water, a 5% sodium hydrogen carbonate solution and once again with water. The chloroform solution is dried over anhydrous sodium sulfate and the solvent is distilled off at 50° under reduced pressure. The residue is dissolved in dilute aqueous hydrochloride acid and the aqueous, hydrochloric solution is extracted with ethyl acetate for purification purposes and is rendered alkaline (pH₉) by means of potassium carbonate. The reaction product which precipitated in the form of an oil is extracted with ethyl acetate. The ethyl acetate solution is dried over anhydrous sodium sulfate, freed from the solvent under reduced pressure and the residue is dissolved in about 100 cc. anhydrous methanol. By adding methanolic hydrochloric acid, the dihydrochloride of the 3-[γ-(4'-(β-3'',5''-trimethoxybenzoxyethyl) - piperazino[1'] - β - hydroxypropyl] - 4 - methyl-7,8-dimethoxy-coumarin is obtained in the form of colorless crystals decomposing at 231–233° (after recrystallization from methanol and water in the ratio of 20:1).

Yield: 49 g.=87% of the theoretical.

The 3 - [γ - (4' - (β - hydroxyethyl) - piperazino[1']) - β - hydroxy - propyl] - 4 - methyl - 7,8 - dimethoxy - coumarin required as starting material can be prepared as follows:

28.4 g. (0.1 mol) 3-[γ-chloro-β-hydroxypropyl]-4-methyl-7,8-dihydroxy-coumarin (prepared by condensing α-acetyl-γ-chloromethyl-butyrolactone with pyrogallol, according to the method described in the British Pat. 1,044,608), are dissolved with heating in 200 cc. dioxan. After cooling down to about 40°, 40 g. dimethyl sulfate are added. Then, with stirring in a nitrogen atmosphere, a solution of 42 g. potassium carbonate dissolved in 80 cc. water is added dropwise. The reaction mixture is stirred at 40° until a sample does not show any longer a yellow tinge when admixed with diluted sodium hydroxide solution, which is the case after roughly 2–3 hours. When the mixture is diluted with water, the reaction product separates in the form of colorless needles. For purification purposes, the crude product filtered off with suction is dissolved in chloroform, the solution is washed with diluted sodium hydroxide solution and dried. After having evaporated the chloroform solution to dryness, the 3-[γ-chloro-β-hydroxypropyl]4-methyl-7,8-dimethoxy-coumarin is obtained in the form of colorless needles having a melting point of 142–144°.

Yield: 27 g.=86.5% of the theoretical.

Analogously there are obtained:

3 - [γ - chloro - β - hydroxypropyl] - 4 - n - propyl - 7,8 - dimethoxy-coumarin. Melting point: 136–137°.

3 - [γ - chloro - β - hydroxypropyl] - 4 - phenyl - 7,8 - dimethoxy-coumarin. Melting point: 142°.

3 - [γ - chloro - β - hydroxypropyl] - 4 - methyl - 7,8 - diethoxy-coumarin. Melting point: 136–138°.

31.2 g. (0.1 mol) 3-(γ-chloro-β-hydroxypropyl)-4-methyl-7,8-dimethoxy-coumarin and 13 g. N-(β-hydroxyethyl)-piperazine are dissolved in 150 cc. chloro benzene and, after the addition of 11 g. anhydrous sodium carbonate, stirred at 120° for 7 hours. After cooling down, the mixture is filtered off with suction from the precipitated sodium chloride and the filtrate is evaporated to dryness under reduced pressure. The crude product crystallizing out is stirred with 100 cc. ethyl acetate for further purification, filtered off with suction, then vacuum-dried. Thus, 3 - [γ - (4' - (β - hydroxyethyl) - piperazino[1'] - β - droxy - propyl] - 4 - methyl - 7,8 - dimethoxy - coumarin is obtained having a melting point of 142–145°.

Yield: 31.3 g.=77% of the theoretical.

The following intermediates can be prepared analogously:

General formula:

| R₁ | R₂ | —A₂— | Melting Point, ° |
|---|---|---|---|
| CH₃ | CH₃O | —CH₂—CH(CH₃)— | 112–114 |
| CH₃ | CH₃O | —CH₂CH₂CH₂— | 123–125 |
| CH₃ | CH₃O | —CH₂CH₂CH₂CH₂— | 84–86 |
| nC₃H₇ | CH₃O | —CH₂CH₂— | 126–128 |
| nC₃H₇ | CH₃O | —CH₂—CH₂(CH₃)— | ¹ 220 |
| nC₃H₇ | CH₃O | —CH₂CH₂CH₂— | 98–100 |
| nC₃H₇ | CH₃O | —CH₂CH₂CH₂CH₂— | ¹ 225 |
| C₆H₅ | CH₃O | —CH₂CH₂— | 118–119 |
| C₆H₅ | CH₃O | —CH₂—CH(CH₃)— | ¹ 178–180 |
| C₆H₅ | CH₃O | —CH₂CH₂CH₂CH₂— | ¹ 135 |
| CH₃ | C₂H₅O | —CH₂CH₂— | ¹ 238–240 |

¹ Decomposition point of the dihydrochloride.

EXAMPLE 3

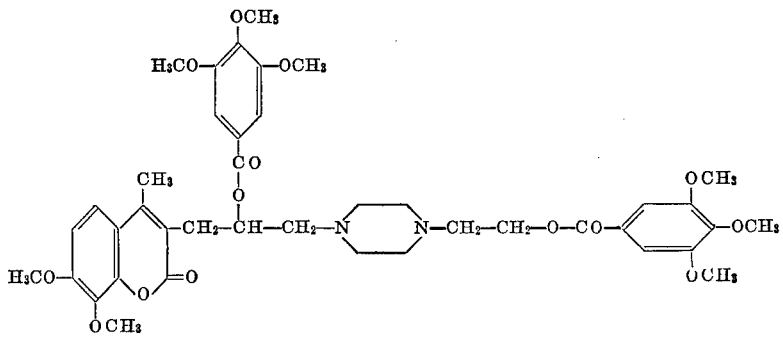

40.6 g. (0.1 mol) 3-[γ-(4'-(β-hydroxyethyl)piperazino [1']) - β - hydroxypropyl] - 4 - methyl -7,8 - dimethoxy - coumarin are dissolved in 350 cc. anhydrous chloroform and 20.2 g. (0.2 mol) triethylamine are added. Within two hours, 46 g. (0.2 mol) 3,4,5-trimethoxybenzoyl chloride, dissolved in 200 cc. anhydrous chloroform are added dropwise with stirring; the internal temperature rising to about 50°. After the decay of the exothermic reaction, the solution is stirred at 40–50° for another 2 hours and subsequently worked up as described in Example 2.

Thus, the dihydrochloride of the diester having the general formula given above is obtained in the form of colorless crystals which decompose at 158° (after recrystallization from methanol).

Yield: 70 g.=82% of the theoretical.

The above-mentioned diester is likewise obtained by reacting in chloroform the monoester obtained according to Example 2 with 3,4,5-trimethoxy benzoyl chloride by adding triethylamine.

The 3 - [γ-piperazino[1']-β-hydroxypropyl]-4-methyl-7,8-dimethoxy-coumarin utilized in the present example as initial product was prepared as follows:

86 g. (1 mol) anhydrous, distilled piperazine are dissolved in 150 cc. chloro benzene and heated to 120° with the addition of 11 g. sodium carbonate. To this mixture a solution of 31 g. (0.1 mol) 3-(γ-chloro-β-hydroxypropyl)-4-methyl-7,8-dimethoxy-coumarin in 150 cc. chloro benzene is added slowly and dropwise with stirring. Stirring is continued at 120° for 12 hours. After the mixture has been filtered off with suction the filtrate is reduced to a small volume in the vacuum, then the major part of the excess piperazine is distilled off. The residue is admixed with water and after the addition of potassium carbonate, extracted with methylene chloride. After drying, the methylene chloride layer is evaporated to dryness under reduced pressure. After the mixture has been allowed to stand for a while, the 3-(γ-piperazino[1']-β-hydroxypropyl) - 4-methyl-7,8-dimethoxy-coumarin crystallizes in the form of colorless needles melting at 124–126°.

Yield: 19 g.=52.5% of the theoretical.

Analogously to the description given in Examples 2, 3 and 4, the following compounds can be prepared under the present invention:

General formula:

EXAMPLE 4

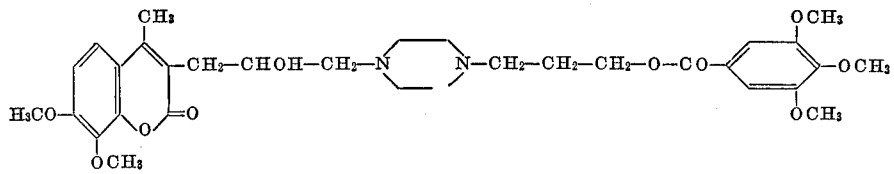

36.2 g. (0.1 mol) 3-[γ-piperazino[1']-β-hydroxypropyl]-4-methyl-7,8-dimethoxy-coumarin are dissolved in 100 cc. chlorobenzene and after the addition of 13.8 g. (0.1 mol) potassium carbonate, at 50–60°, a solution of 29 g. (0.1 mol) γ-chloropropyl-3,4,5-trimethoxybenzoate in 50 cc. chlorobenzene is added dropwise with stirring within one hour. The solution is stirred for 12 hours with heating under reflux, it is filtered off from the insolute while hot and the filtrate is freed from the solvent in the water-jet vacuum. After working up as described in Example 2, the dihydrochloride of the 3-[γ-(4'-(γ-3'',4'',5''-trimethoxybenzoxypropyl) - piperazino[1']) - β - hydroxypropyl]-4-methyl-7,8-dimethoxy-coumarin is obtained in the form of colorless crystals decomposing at 225°.

Yield: 50 g.=73% of the theoretical.

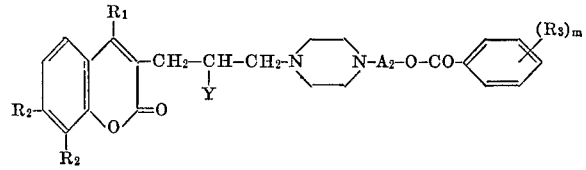

| R₁ | R₂ | Y | —A₂— | ‒(R₃)ₘ | Melting Point or decomposition point of the dihydrochloride, ° |
|---|---|---|---|---|---|
| CH₃ | CH₃O | —OH | —CH₂CH₂CH₂CH₂— | 3,4,5-(OCH₃)₃ | 248 |
| nC₃H₇ | CH₃O | —OH | —CH₂CH₂— | 3,4,5-(OCH₃)₃ | 200 |
| nC₃H₇ | CH₃O | —OH | —CH₂CH₂CH₂— | 3,4,5-(OCH₃)₃ | 195 |
| nC₃H₇ | CH₃O | —OH | —CH₂CH₂CH₂CH₂— | 3,4,5-(OCH₃)₃ | 235 |
| C₆H₅ | CH₃O | —OH | —CH₂CH₂— | 3,4,5-(OCH₃)₃ | 185 |
| C₆H₅ | CH₃O | —OH | —CH₂CH₂CH₂— | 3,4,5-(OCH₃)₃ | 215 |
| C₆H₅ | CH₃O | —OH | —CH₂CH₂CH₂CH₂— | 3,4,5-(OCH₃)₃ | 198 |
| CH₃ | OCH₃ | —O—CO—C₆H₂(OCH₃)₃ | —CH₂CH₂CH₂— | 3,4,5-(OCH₃)₃ | 162 |
| CH₃ | OCH₃ | Same as above | —CH₂—CH(CH₃)— | 3,4,5-(OCH₃)₃ | 151 |
| CH₃ | OCH₃ | do | —CH₂CH₂CH₂CH₂— | 3,4,5-(OCH₃)₃ | 16 |
| nC₃H₇ | OCH₃ | do | —CH₂CH₂— | 3,4,5-(OCH₃)₃ | 160 |
| nC₃H₇ | OCH₃ | do | —CH₂CH₂CH₂— | 3,4,5-(OCH₃)₃ | 176 |
| nC₃H₇ | OCH₃ | do | —CH₂—CH(CH₃)— | 3,4,5-(OCH₃)₃ | 170 |
| nC₃H₇ | OCH₃ | do | —CH₂CH₂CH₂CH₂— | 3,4,5-(OCH₃)₃ | 172 |
| C₆H₅ | OCH₃ | do | —CH₂CH₂— | 3,4,5-(OCH₃)₃ | 148 |
| C₆H₅ | OCH₃ | do | —CH₂CH₂CH₂— | 3,4,5-(OCH₃)₃ | 151 |
| C₆H₅ | OCH₃ | do | —CH—(CH₃)— | 3,4,5-(OCH₃)₃ | 142 |
| C₆H₅ | OCH₃ | do | —CH₂CH₂CH₂CH₂— | 3,4,5-(OCH₃)₃ | 169 |
| CH₃ | OCH₃ | —O—CO—C₆H₃(OCH₃)₂ | —CH₂CH₂— | 3,5-(OCH₃)₂ | 160 |
| CH₃ | OCH₃ | —O—CO—C₆H₄—OCH₃ | —CH₂CH₂— | 4-OCH₃ | 162 |
| CH₃ | OC₂H₅ | —O—CO—C₆H₂(OCH₃)₃ | —CH₂CH₂— | 3,4,5-(OCH₃)₃ | 130 |
| CH₃ | OCH₃ | —O—CO—C₆H₄—OCH₃ | —CH₂CH₂— | 3,4,5-(OCH₃)₃ | 210 |
| CH₃ | OCH₃ | —O—CO—C₆H₂(OCH₃)₃ | —CH₂CH₂— | 3,4,5-(OCH₃)₃ | 20 |

EXAMPLE 5

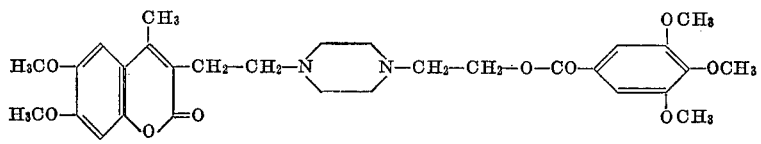

37.6 g. (0.1 mol) 3-[β-(4′-(β-hydroxyethyl)-piperazino[1′])-ethyl]-4-methyl-6,7-dimethoxy-coumarin are suspended in 200 cc. anhydrous benzene and 10.1 g. (0.1 mol) triethylamine are added. Within 30 minutes, a solution of 23 g. (0.1 mol) 3,4,5-trimethoxybenzoyl chloride in 100 cc. anhydrous benzene is added dropwise with stirring at room temperature. The mixture is stirred for 4–5 hours at this temperature. Subsequently, it is stirred under reflux for 2 hours and, while hot, separated triethylamine hydrochloride is filtered off with suction. The filtrate is washed with water, a 5% sodium hydrogen carbonate solution and again with water and dried over anhydrous sodium sulfate. The solvent is now distilled off at 50° in the water-jet vacuum and the residue, a light-yellow, viscous oil, is dissolved in dilute, aqueous hydrochloric acid. For purification purposes, the hydrochloric, aqueous solution is extracted with ethyl acetate. The limpid aqueous phase is rendered alkaline with potassium carbonate and is again extracted with ethyl acetate. The resultant ethyl acetate solution is washed again with water, dried over anhydrous sodium sulfate and reduced to a volume of about 50 cc. The residue is admixed with ethereal hydrochloric acid until congo paper turns blue. The precipitated dihydrochloride of the 3-[β-(4′-(β-3″,4″,5″ - trimethoxybenzoxyethyl) - piperazino-[1′])-ethyl]-4-methyl-6,7-dimethoxy-coumarin decomposes at 224° after recrystallization from anhydrous methanol.

Yield: 47 g.=73% of the theoretical.

The 3-[β-(4′-(β-hydroxyethyl)-piperazino[1′])-ethyl]-4-methyl-6, 7-dimethoxy-coumarin used as starting material can be prepared as follows:

(a) 13 g. (0.055 mol) 3-(β-hydroxyethyl)-4-methyl-6,7-dihydroxy-coumarin (prepared by condensing 1,2,4-triacetoxy benzene with α-acetylbutyrolactone, analogously to the method described in Chem. Abstr. 54, 24690 g., (1960)), 40 cc. glacial acetic acid and 36 cc. 48% hydrobromic acid are stirred at 110–115° for 5 hours. After cooling down, the reaction mixture is poured into the fivefold quantity of water and the precipitate which has settled out is filtered off with suction. The reaction product which is still wet can be recrystallized from glacial acetic acid. Thus, 12 g. (=73% of the theoretical) 3-($\beta$-bromo-ethyl)-4-methyl-6, 7-dihydroxy-coumarin are obtained having a melting point of 262°. Analogously, the following products were prepared:

3-($\beta$-bromoethyl)-1-n-propyl-6,7-dihydroxy-coumarin.
  Melting point: 250–252°.
3-($\beta$-bromoethyl)-4-phenyl-6,7-dihydroxy-coumarin.
  Melting point: 255°.

(b) 15 g. (0.05 mol) 3-($\beta$-bromoethyl)-4-methyl-6, 7-dihydroxy-coumarin are dissolved in 100 cc. dioxan and admixed with 25 g., dimethyl sulfate. When passing nitrogen through this mixture, a solution of 7 g. sodium hydroxide in 20 cc. water is added dropwise with stirring, at 35–40°. Stirring of the reaction mixture is continued at 35–40° until it does not show an alkaline reaction any longer. After a further addition of 25 g. dimethyl sulfate, again a solution of 7 g. sodium hydroxide in 20 cc. water is added dropwise. After the reaction mixture is no longer alkaline it is evaporated to dryness in the water-jet vacuum and the residue is diluted with water. The precipitated reaction product is dissolved in ethyl acetate and the ethyl acetate layer is washed with diluted sodium hydroxide solution, then dried and evaporated to dryness under reduced pressure. Thus, 3-($\beta$-bromoethyl)-4-methyl-6, 7-dimethoxy-coumarin is obtained in the form of colorless crystals melting at 215–216°.
  Yield: 10 g.=61% of the theoretical.

Analogously to the process as described above, the following intermediates can be prepared:

3-($\beta$-bromoethyl)-4-n-propyl - 6,7 - dimethoxy-coumarin.
  Melting point: 114–117°.
3-($\beta$-bromoethyl)-4-phenyl - 6,7 - dimethoxy-coumarin.
  Melting point: 190–191°.

(c) 32.7 g. (0.1 mol) 3-($\beta$-bromoethyl)-4-methyl-6, 7-dimethoxy-coumarin and 13 g. (0.1 mol) N-($\beta$-hydroxyethyl)-piperazine are dissolved in 100 cc. chlorobenzene. After the addition of 10.6 g. (0.1 mol) anhydrous sodium carbonate, the solution is stirred for 12 hours with boiling under reflux. After cooling down, precipitated sodium bromide is filtered off with suction and the filtrate is evaporated to dryness under reduced pressure. The remaining oily crude product is crystallized by stirring it with little ethyl acetate. The crystallized product is filtered off with suction and, for further purification, recrystallized from ethyl acetate. Thus, 3-[$\beta$-(4'-hydroxyethyl-piperazino[1'])-ethyl - 4 - methyl - 6,7 - di- methoxy-coumarin is obtained having a melting point of 128–130°.
  Yield: 32 g.=85% of the theoretical.

Analogously, the intermediates of the following general formula can be synthetized:

General formula:

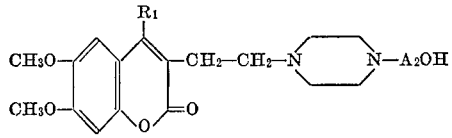

| $R_1$ | —$A_2$— | Melting Point, ° |
|---|---|---|
| $CH_3$ | —$CH_2$—$CH(CH_3)$— | 108–110 |
| $CH_3$ | —$CH_2CH_2CH_2$— | 147–148 |
| $nC_3H_7$ | —$CH_2CH_2$— | 133–135 |
| $nC_3H_7$ | —$CH_2$—$CH(CH_3)$— | 115–117 |
| $nC_3H_7$ | —$CH_2CH_2CH_2$— | 125–127 |
| $nC_3H_7$ | —$CH_2CH_2CH_2CH_2$— | 116–118 |
| $C_6H_5$ | —$CH_2CH_2$— | 142–143 |
| $C_6H_5$ | —$CH_2CH_2CH_2$— | 127–128 |
| $C_6H_5$ | —$CH_2$—$CH(CH_3)$— | 151–152 |

Analogously to the description given in the present example, paragraph 1, the following compounds can be prepared under the present invention from the above-mentioned intermediates:

General formula:

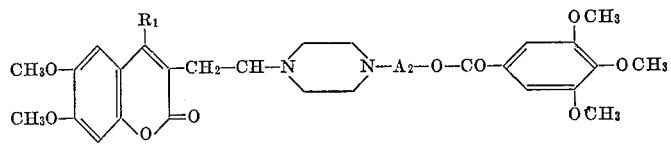

| $R_1$ | —$A_2$— | Melting Point or decomposition point of the dihydrochloride, ° |
|---|---|---|
| $CH_3$ | —$CH_2$—$CH(CH_3)$— | 186 |
| $CH_3$ | —$CH_2CH_2CH_2$— | 235 |
| $nC_3H_7$ | —$CH_2CH_2$— | 232 |
| $nC_3H_7$ | —$CH_2CH(CH_3)$— | 206 |
| $nC_3H_7$ | —$CH_2CH_2CH_2$— | 236 |
| $nC_3H_7$ | —$CH_2CH_2CH_2CH_2$— | 215 |
| $C_6H_5$ | —$CH_2CH_2$— | 120 |
| $C_6H_5$ | —$CH_2CH_2CH_2$— | 152 |
| $C_6H_5$ | —$CH_2$—$CH(CH_3)$— | 158 |

EXAMPLE 6

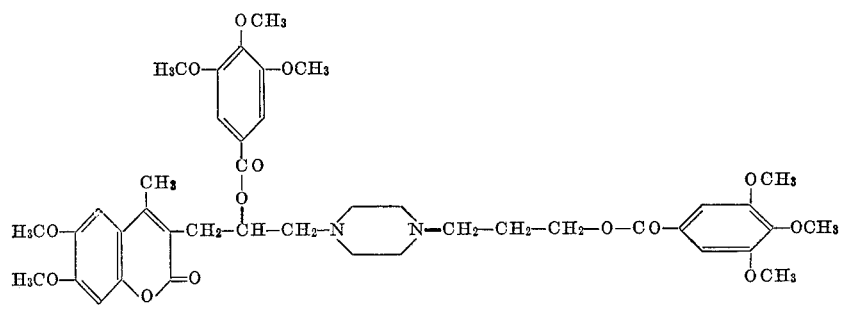

42.0 g. (0.1 mol) 3-[$\gamma$-(4'-($\gamma$-hydroxypropyl)-piperazino-[1']) - $\beta$-hydroxypropyl]-4-methyl-6,7-dimethoxy-coumarin are dissolved in 300 cc. anhydrous chloroform and 20.2 g. (0.2 mol) triethylamine are added. Within 2 hours, a solution of 46 g. (0.2 mol) 3,4,5-trimethoxybenzoyl chloride in 100 cc. anhydrous chloroform is added dropwise with stirring, the internal temperature rising to about 45°. After the decay of the exothermic reaction the solution is stirred at 40–50° for another 2 hours. The reaction solution is first washed with water, then with dilute aqueous sodium hydrogen carbonate solution and finally again with water and is subsequently worked up as described in Example 5.

The dihydrochloride of the 3-[γ-(4'-(γ-3",4",5"-trimethoxybenzoxypropyl) - piperazino[1'])-β-3",4",5"-trimethoxybenzoxypropyl] - 4-methyl-6,7-dimethoxy-coumarin is obtained in the form of colorless crystals decomposing at 188°.

Yield: 69 g.=78.5% of the theoretical.

The 3-[γ-(4'-(γ-hydroxypropyl)-piperazino[1'])-β-hydroxypropyl]-4-methyl-6,7-dimethoxy-coumarin required as starting material can be prepared as follows:

28.4 g. (0.1 mol) 3-[γ-chloro-β-hydroxypropyl]-4-methyl-6,7dihydroxy-coumarin (prepared by condensing α-acetyl-γ-chloromethyl-butyrolactone with 1,2,4-triacetoxybenzene analogously to the method described in British Pat. 1,044,608) are dissolved with heating in 200 cc. dioxan. After cooling down to about 40°, 40 g. dimethyl sulfate are added. Then, with stirring in a nitrogen atmosphere, a solution of 42 g. potassium carbonate dissolved in 80 cc. water is added dropwise. The reaction mixture is stirred at 40° until a sample does not shown any longer a yellow tinge when admixed with diluted sodium hydroxide solution, which is the case after roughly 2–3 hours.

General formula:

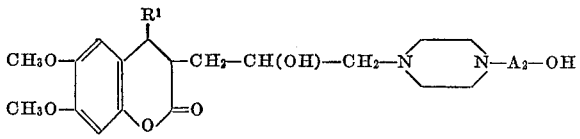

| $R_1$ | —$A_2$— | Melting Point, ° |
|---|---|---|
| $CH_3$ | —$CH_2$—$CH(CH_3)$— | 200–202 |
| $CH_3$ | —$CH_2CH_2$— | 153–155 |
| $CH_3$ | —$CH_2CH_2CH_2CH_2$— | 104–106 |
| $nC_3H_7$ | —$CH_2CH_2$— | ¹ 242–244 |
| $nC_3H_7$ | —$CH_2$—$CH(CH_3)$— | 140–141 |
| $nC_3H_7$ | —$CH_2CH_2CH_2$— | 132–137 |
| $nC_3H_7$ | —$CH_2CH_2CH_2CH_2$— | 97–99 |
| $C_6H_5$ | —$CH_2CH_2$— | 133 |
| $C_6H_5$ | —$CH_2$—$CH(CH_3)$— | ¹ 224–225 |
| $C_6H_5$ | —$CH_2CH_2CH_2CH_2$— | 116–118 |
| $C_6H_5$ | —$CH_2CH_2CH_2$— | 124 |

¹ As dihydrochloride.

Analogously to the description given in paragraph 1 of the present example, the following compounds can be prepared under the present invention:

General formula:

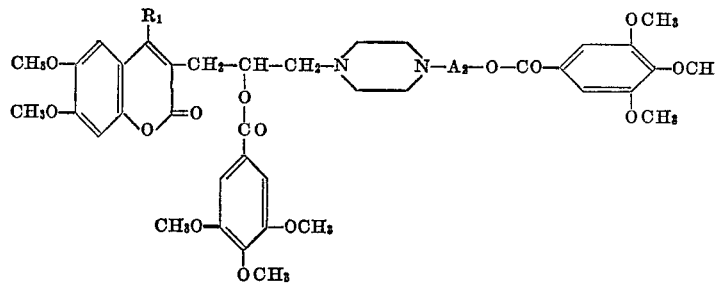

When this mixture is diluted with water, the reaction product precipitates in the form of colorless needles. For purification purposes, the crude product filtered off with suction is dissolved in chloroform, the solution is washed with diluted sodium hydroxide solution and dried. After having evaporated the chloroform solution to dryness, the 3-[γ-chloro-β-hydroxypropyl] - 4-methyl-6,7-dimethoxy-coumarin is obtained in the form of colorless needles having a melting point of 184–185°.

Yield: 24.8 g.=79% of the theoretical.

Analogously there are obtained:

3-[γ-chloro-β-hydroxypropyl] - 4-n-propyl-6,7-dimethoxy-coumarin. Melting point: 132°.

3-[γ-chloro-β-hydroxypropyl] - 4-phenyl-6,7-dimethoxy-coumarin. Melting point: 100°.

31.2 g. (0.1 mol) 3-(γ-chloro-β-hydroxypropyl)-4-methyl-6,7-dimethoxy-coumarin and 14.4 g. N-(γ-hydroxypropyl)-piperazine are dissolved in 150 cc. chloro benzene and, after the addition of 11 g. anhydrous sodium carbonate, stirred at 120° for 7 hours. After cooling down, the mixture is filtered off with suction from the precipitated sodium chloride and the filtrate is evaporated to dryness under reduced pressure. The crude product crystallizing out is stirred with 100 cc. ethyl acetate for further purification, filtered off with suction, then vacuum-dried. Thus, 3-[γ-(4'-(γ-hydroxypropyl) - piperazino[1'])-β-hydroxypropyl] - 4 - methyl-6,7-dimethoxy-coumarin is obtained having a melting point of 148–151°.

Yield: 30 g.=71.5% of the theoretical.

The following intermediates can be prepared analogously:

| $R_1$ | —$A_2$— | Melting Point or decomposition point of the dihydrochloride, ° |
|---|---|---|
| $CH_3$ | —$CH_2CH_2$— | 158 |
| $CH_3$ | —$CH_2$—$CH(CH_3)$— | 160 |
| $CH_3$ | —$CH_2CH_2CH_2CH_2$— | 130 |
| $nC_3H_7$ | —$CH_2CH_2$— | 155 |
| $nC_3H_7$ | —$CH_2$—$CH(CH_3)$— | 160 |
| $nC_3H_7$ | —$CH_2CH_2CH_2$— | 158 |
| $nC_3H_7$ | —$CH_2CH_2CH_2CH$— | 148 |
| $C_6H_5$ | —$CH_2CH_2$— | 172 |
| $C_6H_5$ | —$CH_2CH_2CH_2$— | 165 |
| $C_6H_5$ | —$CH_2$—$CH(CH_3)$— | 167 |
| $C_6H_5$ | —$CH_2CH_2CH_2CH_2$— | 148 |

What is claimed is:

1. New therapeutic coumarin derivatives having the formula

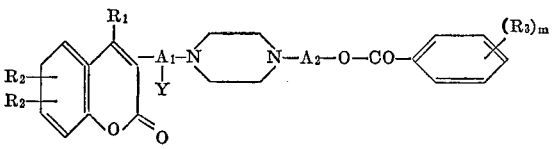

wherein $R_1$ is selected from the group consisting of hydrogen, lower alkyl and phenyl, $R_2$ is selected from 6,7- and 7,8-positioned alkoxy having 1–4 carbon atoms, $R_3$ is lower alkoxy having 1–4 carbon atoms, m is selected from the integers 1, 2, and 3, $A_1$ is selected from the straight and branched alkylene radicals having 2–3 carbon atoms, $A_2$ is selected from straight and branched alkylene radicals having 2–4 carbon atoms, and Y is selected from hydrogen, hydroxy or the radical

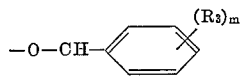

or hydrochlorides of said coumarin derivatives.

2. Coumarin derivatives as set forth in claim 1, wherein $R_1$ is selected from the group consisting of methyl, propyl and phenyl, $R_2$ is methoxy in 7–8 positions, $R_2$ is methoxy in 3-4-5-positions, m is 3, $A_1$—Y is $CH_2$—$CH_2$, and $A_2$ is selected from the group consisting of ethylene, propylene, isopropylene and butylene, or the hydrochlorides of said coumarin derivatives.

3. Coumarin derivatives as set forth in claim 1, wherein $R_1$ is selected from the group consisting of methyl, propyl and phenyl, $R_2$ is methoxy in 7-8-positions, $R_3$ is methoxy in 3-4-5-positions, m is 3, $A_2$—Y is $CH_2CHOH$-$H_2$, and $A_2$ is selected from the group consisting of ethylene, propylene, isopropylene and butylene, or hydrochlorides of said coumarine derivatives.

4. Coumarin derivatives as set forth in claim 1, wherein $R_1$ is selected from the group consisting of methyl, propyl and phenyl, $R_2$ is selected from the group consisting of methoxy and ethoxy in 7-8-position, $R_3$ is selected from the group consisting of methoxy in 3-, 4-, 5-, 3-4-, 3-5-, 4-5- and 3-4-5-positions, m is selected from the group consisting of 1,2, and 3, $A_2$ is selected from the group consisting of ethylene, propylene, isopropylene and butylene, and $A_1$—Y is

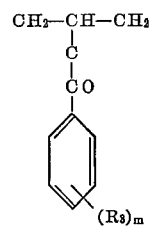

or hydrochloride of said coumarin derivatives.

5. 3-[β-4'-(β-3″,4″,5″ - trimethoxybenzoylethyl) - piperazino[1']-ethyl]-4-methyl - 7,8 - dimethoxy-coumarin, or hydrochloride of said coumarin derivative.

6. 3-[β-(4'-(β-3″, 4″, 5″-trimethoxybenzoxypropyl)-piperazino[1'])-ethyl]-4-propyl-7-,8 - dimethoxy - coumarin, or hydrochloride of said coumarin derivatives.

7. 3-[γ-(α - 3″,4″,5″ - trimethoxybenzoxyethyl)-piperazino[1'] - β - 3″,4″,5″ - trimethoxybenzoxypropyl] - 4-methyl-7,8-dimethoxy-coumarin, or hydrochloride of said coumarin derivative.

8. 3-[γ-(4'-(β-3″,4″, 5″ - trimethoxybenzoxyethyl)-pi - perazino[1'])-β-3″, 4″, 5″-trimethoxybenzoxypropyl]-4-methyl-7,8-diethoxy-coumarin, or hydrochloride of said coumarin derivative.

9. 3-[γ-4'-(β-3″,4″,5″ - trimethoxybenzoxyethyl) - piperanzino[1'])-β-3″,4″5″-trimethoxybenzoxypropyl] - 4 - propyl17,8-dimethoxy-coumarin, or hydrochloride of said coumarin derivative.

References Cited

Morrison et al.: "Organic Chemistry," 1959, p. 483.

ALEX MAZEL, Primary Examiner

R. V. RUSH, Assistant Examiner

U.S. Cl. X.R.

414—250.